(12) United States Patent
deGaribody

(10) Patent No.: US 10,161,773 B2
(45) Date of Patent: Dec. 25, 2018

(54) METHODS AND APPARATUS TO DETERMINE AIRFLOW CONDITIONS AT AN INLET OF AN ENGINE

(71) Applicant: The Boeing Company, Chicago, IL (US)

(72) Inventor: John Russell deGaribody, Florissant, MO (US)

(73) Assignee: The Boeing Company, Chicago, IL (US)

( * ) Notice: Subject to any disclaimer, the term of this patent is extended or adjusted under 35 U.S.C. 154(b) by 275 days.

(21) Appl. No.: 15/092,198

(22) Filed: Apr. 6, 2016

(65) Prior Publication Data
US 2016/0216142 A1    Jul. 28, 2016

Related U.S. Application Data

(63) Continuation of application No. 14/276,091, filed on May 13, 2014, now Pat. No. 9,334,807.

(51) Int. Cl.
| | |
|---|---|
| *G06F 19/00* | (2018.01) |
| *G01F 1/66* | (2006.01) |
| *F02C 9/26* | (2006.01) |
| *G01S 17/02* | (2006.01) |
| *G01S 17/88* | (2006.01) |
| *G01F 1/76* | (2006.01) |
| *G01S 17/58* | (2006.01) |
| *G01F 1/86* | (2006.01) |

(Continued)

(52) U.S. Cl.
CPC ............... *G01F 1/661* (2013.01); *F02C 7/04* (2013.01); *F02C 9/26* (2013.01); *G01F 1/76* (2013.01); *G01F 1/86* (2013.01); *G01F 15/043* (2013.01); *G01S 17/02* (2013.01); *G01S 17/58* (2013.01); *G01S 17/88* (2013.01); *F05D 2270/3061* (2013.01); *F05D 2270/804* (2013.01)

(58) Field of Classification Search
None
See application file for complete search history.

(56) References Cited

U.S. PATENT DOCUMENTS

| | | | |
|---|---|---|---|
| 6,253,166 B1 | 6/2001 | Whitmore et al. | |
| 8,072,584 B2 | 12/2011 | Caldwell et al. | |

(Continued)

FOREIGN PATENT DOCUMENTS

| | | |
|---|---|---|
| EP | 1460266 | 9/2004 |
| WO | 9935519 | 7/1999 |

OTHER PUBLICATIONS

United States Patent and Trademark Office, "Notice of Allowance", issued in connection with U.S. Appl. No. 14/276,091, dated Jan. 1, 2016, 14 pages.

(Continued)

*Primary Examiner* — Adam M Alharbi
(74) *Attorney, Agent, or Firm* — Hanley, Flight and Zimmerman, LLC

(57) ABSTRACT

Methods and apparatus to determine airflow conditions at an inlet of an engine are disclosed herein. An example method disclosed herein includes providing a frame having an inner surface and an opening therethrough to define a passageway; and mounting laser sensors to the inner surface of the frame, the laser sensors to measure a characteristic of a fluid that is to flow through the passageway of the frame.

19 Claims, 10 Drawing Sheets

(51) Int. Cl.
    *G01F 15/04*        (2006.01)
    *F02C 7/04*         (2006.01)

(56) References Cited

U.S. PATENT DOCUMENTS

| | | | |
|---|---|---|---|
| 8,308,423 B2 * | 11/2012 | Berryann | F02K 1/12 |
| | | | 415/13 |
| 9,334,807 B2 | 5/2016 | deGaribody | |
| 2005/0154503 A1 * | 7/2005 | Jacobs | G05D 1/024 |
| | | | 701/1 |
| 2009/0046289 A1 | 2/2009 | Caldwell et al. | |
| 2009/0051896 A1 | 2/2009 | Caldwell et al. | |
| 2010/0023369 A1 * | 1/2010 | Chapman | G06Q 10/04 |
| | | | 701/101 |
| 2010/0195100 A9 | 8/2010 | Caldwell et al. | |

OTHER PUBLICATIONS

United States Patent and Trademark Office, "Non-Final Office action", issued in connection with U.S. Appl. No. 14/276,091, dated Jul. 2, 2015, 22 pages.

* cited by examiner

US 10,161,773 B2

METHODS AND APPARATUS TO DETERMINE AIRFLOW CONDITIONS AT AN INLET OF AN ENGINE

CROSS REFERENCE TO RELATED APPLICATION

This patent arises from a continuation application of U.S. patent application Ser. No. 14/276,091, filed on May 13, 2014, (now U.S. Pat. No. 9,334,807), titled Methods and Apparatus to Determine Airflow Conditions at an Inlet of an Engine, which is hereby incorporated herein by reference in its entirety.

FIELD

The present disclosure relates generally to fuel monitoring systems and, more particularly, to methods and apparatus to determine airflow conditions at an inlet of an engine.

BACKGROUND

Engine control systems are often employed to control a fuel flow rate to a combustion chamber of an engine in response to a command input (e.g., a throttle or thrust lever position). For example, an engine control system (e.g., a Full Authority Digital Engine Controller (FADEC)) adjusts fuel rate based on flight conditions to improve fuel economy, thrust, engine noise and/or other performance criteria. For example, an example aircraft engine control system typically receives multiple input variables of current flight conditions including, for example, altitude, air speed, angle of attack, throttle lever position, air pressure, air temperature, engine temperatures, engine pressures, exhaust outlet velocity, and/or other parameter(s). In addition, some of the input variables (e.g., air density) are calculated or determined based on other measured conditions or parameter(s). Engine operating parameters such as fuel flow, stator vane position, bleed valve position, and/or others parameter(s) are computed from this data and applied as appropriate or needed. For example, the FADEC provides optimum engine efficiency for given flight conditions that may vary throughout a flight path or operating envelope (e.g., taxing, take-off, cruise, and/or landing) of an aircraft.

SUMMARY

An example method disclosed herein includes providing a frame having an inner surface and an opening therethrough to define a passageway; and mounting laser sensors to the inner surface of the frame, the laser sensors to measure a characteristic of a fluid that is to flow through the passageway of the frame.

An example method disclosed herein includes mounting a laser sensor to an inner surface of a duct; and coupling the duct to an engine, the duct to define an inlet of the engine, the laser sensor to measure an airflow characteristic through the inlet when the duct is coupled to the engine.

An apparatus disclosed herein includes a frame mountable to a nacelle of the aircraft engine. The frame has a passageway to define an inlet of the aircraft engine. The frame is to be positioned upstream from a fan of the aircraft engine. Laser sensors are coupled to a frame. The laser sensors are radially spaced relative to a longitudinal axis of the aircraft engine. The laser sensors measure at least one of a pressure characteristic, a temperature characteristic or a velocity characteristic of an airflow moving through the passageway.

Figure 1:
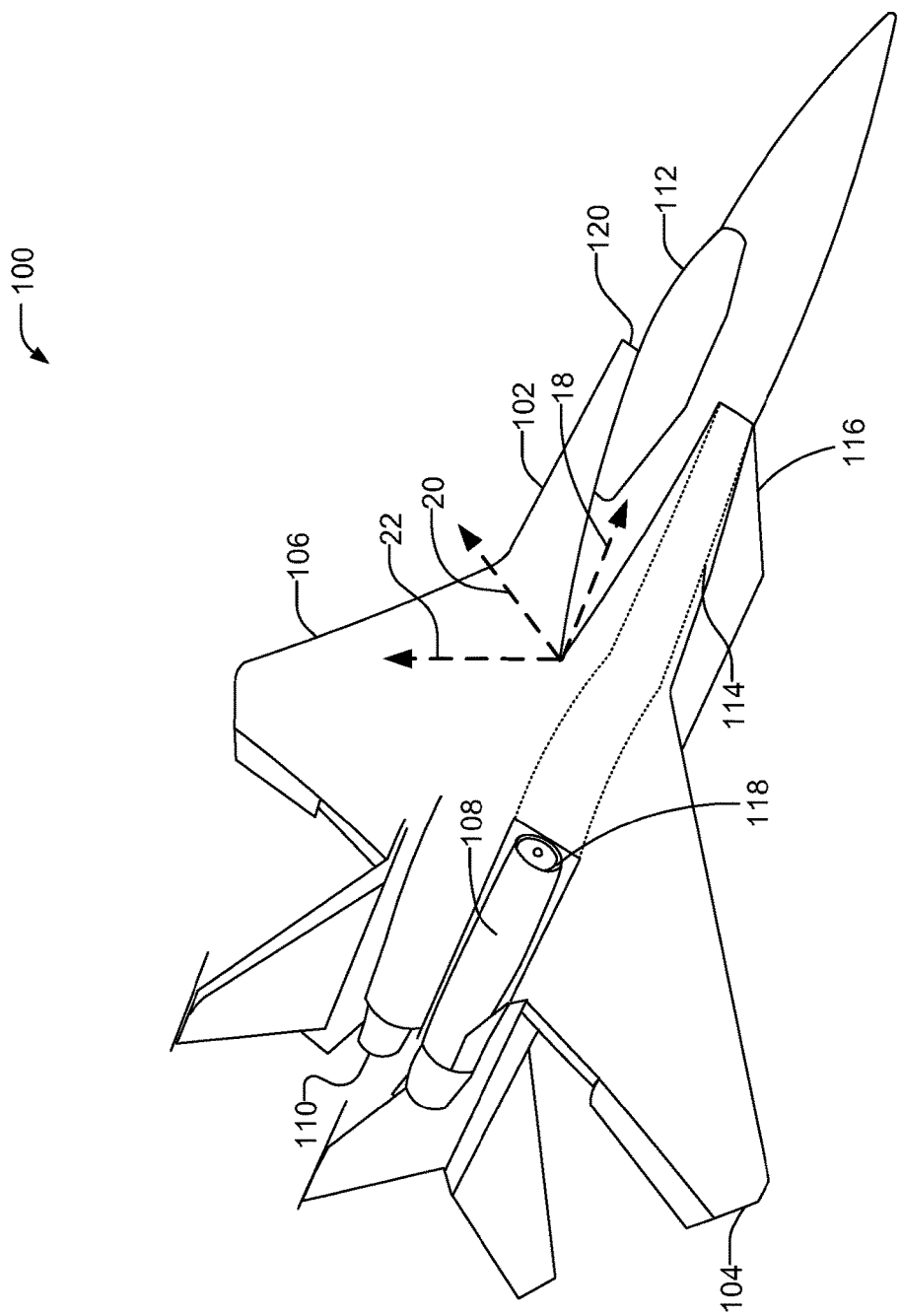
FIG. 1 is a perspective view of an example aircraft that may be implemented with the teachings disclosed herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

In general, a fuel flow rate needed to produce a desired output of an engine varies during an operational envelope of the engine. For example, an amount of fuel needed to produce a desired thrust of an aircraft engine varies with different flight conditions (e.g., differences in air temperature or pressure, an angle of attack as the aircraft climbs, etc.). Typically, known aircraft engine control systems employ a flush airdata sensing system (e.g., FADS) to determine flight conditions. In particular, the flush airdata sensing system infers or calculates airdata using surface pressure measurements and other measured parameters such as, for example, air temperature, altitude, air speed, etc. The engine control system uses aerodynamic model equations to mathematically extract or estimate airdata parameters or characteristics based on the flush surface pressure measurements measured by pressure sensors of the FADS system. For example, based on the surface pressure measurements, the flush airdata sensing systems infers or calculates air density and estimates an air mass flow rate. This estimated air mass flow rate is used to determine a fuel flow mass rate for a fuel-to-air ratio calculated for a given flight condition(s). For example, the estimated fuel flow rate provides an optimum combustion and/or ignition timing for the estimated air condition and/or aircraft condition.

In some examples, during flight maneuvering (e.g., a high angle of attack), surface pressure data provided by a flush airdata sensing system (i.e., FADS system) may not provide an air mass flow rate representative of an actual air mass flow rate because the sensed surface pressure reading may not account for or determine, for example, turbulent flow. When airflow at the inlet of the engine is turbulent, for example, the actual air mass flow rate may be significantly less than the air mass flow rate calculated or estimated using the surface pressure measurements provided by the FADS system. In other words, the pressure sensors of the FADS system cannot sense turbulent flow conditions based only on the surface pressure measurements. Thus, in some examples, an engine control system may not respond accurately and/or promptly to detect changes in airflow due to sudden altitude changes and/or extreme maneuvering of the aircraft and adjust the fuel flow rate accordingly. Thus, an amount of fuel provided to a combustion chamber of an aircraft engine may be greater than an amount of fuel needed for the actual air mass flow rate in the combustion chamber. In some instances, for example during extreme maneuvering of a military aircraft, failing to provide a proper fuel-to-air ratio may cause aircraft engine compressor stall or flameout, which may require restarting the engine during flight prior to the engine losing thrust.

Compressor stall, for example, may occur during extreme flight maneuvering and may result in airflow separations within an intake compressor blade of an aircraft engine. A compressor stall is an imbalance between an inlet velocity and compressor rotational speed that may be caused by different airflow during extreme flight maneuvering and typically occurs when the angle of attack of a compressor blade exceeds a critical angle of attack. As a result, smooth or laminar airflow is interrupted and turbulent airflow is created with pressure fluctuations. Such pressure fluctuations may cause an increase in pressure in the compressor causing airflow in the compressor to slow down and stagnate, sometimes reversing direction. Although some aircraft engines employ a variable inlet guide vane and variable stator vanes to inhibit compressor stall by directing incoming air into rotor blades at an appropriate angle, compressor stall may occur in some situations when an aircraft (e.g., a military aircraft) maneuvers through the air. Most compressor stalls often correct themselves by reducing a fuel flow rate to a combustion chamber of the aircraft engine. However, compressor stall can be avoided if a lack of airflow is detected prior to supplying the fuel to the combustion chamber.

In some instances, flameout occurs during the operation of an aircraft engine when a flame in the combustion chamber of the aircraft engine unintentionally blows out. For example, when a rich limit of a fuel-to-air ratio is exceeded in a combustion chamber, the flame may blow out. This may result from very fast engine acceleration in which an overly rich mixture causes a fuel temperature to drop below a combustion temperature. It may also be caused by insufficient airflow to support combustion. As a result, the flameout may require engine restart once the condition is corrected. For example, flameout and auto relight detection logic within a FADEC of an aircraft engine detects an engine flameout and attempts an automatic relight before the engine loses power or, if relight is unsuccessful, the FADEC may command an engine shutdown.

In commercial aircraft, for example, during taxing, take-off and/or low altitude flight, failing to provide a proper fuel-to-air ratio may cause the engine to burn more fuel than necessary, thereby decreasing an efficiency of an aircraft engine.

Methods and apparatus disclosed herein measure an airflow characteristic(s) (e.g., a varying airflow characteristic) through an inlet (e.g., through an inlet of an engine). For example, the airflow characteristic(s) may vary throughout an operational envelope of the engine. To detect an airflow characteristic through the inlet of the engine, the example apparatus and methods disclosed herein employ a laser sensor at the inlet (e.g., of the engine). More specifically, the methods and apparatus disclosed herein enable characteristic(s) of an airflow flowing at or through an inlet to be measured using a laser sensor apparatus or system that is not obtrusive to the airflow. For example, an example laser sensor disclosed herein may be flush mounted relative to an inner surface (e.g., an aerodynamic surface) of a duct, frame or any other structure adjacent or defining the inlet (e.g., an engine inlet) so that the laser sensor does not affect, obstruct or divert the airflow through the inlet.

The example methods and apparatus disclosed herein adjust a parameter or characteristic (e.g., a fuel flow rate of an engine) in response to a varying characteristic(s) (e.g., an airflow characteristic) that is measured at the inlet (e.g., an inlet of an engine during operation of the engine). For example, airflow measurements at an inlet of an engine may vary throughout a flight path of an aircraft or vehicle (e.g., taxing, take-off, cruise and/or landing), a travel envelope of an automobile (e.g., acceleration, cruising, etc.) and/or any other vehicle or any system or device for which a varying characteristic may be measured. For example, the example methods and apparatus disclosed herein may be used to determine or calculate an air mass flow rate through the inlet (e.g., an engine inlet). More specifically, the example methods and apparatus disclosed herein calculate or measure a mass of air that passes through a cross-sectional area of an inlet per unit of time based on the airflow characteristic(s) provided or measured by an example laser sensor system disclosed herein. In some examples, the air mass flow rate is determined or calculated by measuring a velocity of the air through the inlet, measuring an air pressure and a temperature of the air at the inlet to determine a density of the air, and measuring a flow area of the inlet through which the airflow is passing.

The example methods and apparatus disclosed herein may adjust another characteristic or a parameter of, for example, an engine, a system and/or any other device in response to the varying airflow characteristic measured at the inlet. For example, after an air mass flow rate is calculated at the inlet using the laser system disclosed herein, the example methods and apparatus adjust or determine a fuel mass flow rate based on the air mass flow rate measured or calculated from the airflow measurement provided by the example laser sensor at the engine inlet. In some examples, the methods and apparatus disclosed herein provide real time mass airflow data (e.g., air mass flow rate) to a vehicle controller (e.g., a Full Authority Digital Engine Controller (FADEC), an automobile central controller, etc.) and the vehicle controller determines or adjusts the mass fuel flow to a combustion engine based on the mass airflow data. The examples disclosed herein determine or calculate an air mass flow rate through an engine inlet with greater accuracy than traditional devices and/or methods used to estimate an air mass flow rate through an engine inlet or a cross-sectional area of an engine inlet. As a result, in some examples, the example methods and apparatus disclosed herein increase engine efficiency (e.g., increase a commercial aircraft engine efficiency by approximately between 2 percent and 10 percent), reduce fuel consumption, increase a travel range, provide greater mixture control for engine restarts and control, etc. In some examples, the example methods and apparatus disclosed herein prevent or reduce engine flameout or compressor stall.

The example methods and apparatus disclosed herein may be used with turbojet engines, turbofan engines, propeller engines, internal combustion engines, automobile engines, an air filtration system, a heater, a conditioner, and/or any other vehicle, engine, system or apparatus that requires adjusting a parameter (e.g., fuel flow demand) based on an airflow condition(s). For example, varying airflow characteristics at an inlet of an air filtration system may be measured and/or determined using the example laser sensor methods and apparatus disclosed herein (e.g., positioned at an inlet of the air filtration system). The measured varying airflow characteristic(s) may be used to adjust a parameter or other characteristic(s) of the air filtration system.

FIG. 1 illustrates an example aircraft 100 that may embody aspects of the teachings of this disclosure. The example aircraft 100 of FIG. 1 is a fixed-wing aircraft for military applications. In the illustrated example, the aircraft 100 includes a fuselage 102, a first wing 104 and a second wing 106. A first engine 108 and a second engine 110 of the example aircraft 100 are disposed in the fuselage 102 aft of a canopy 112. To reduce an airspeed of air flowing to the first and second engines 108 and 110 to speeds less than supersonic speed when the aircraft 100 flies at speeds greater than supersonic speed, the example aircraft 100 of the illustrated example includes air intake ducts 114 and 120. In particular, the air intake ducts 114 and 120 of the illustrated example direct airflow to the respective first and second engines 108 and 110 at speeds less than supersonic speeds. The example air intake ducts 114 and 120 (e.g., an S-duct) of the illustrated example are positioned within the fuselage 102. The air intake duct 114, for example, directs airflow from an inlet 116 of the air intake duct 114 to an inlet 118 of the first engine 108 and reduces the airflow speed to less than supersonic speed. Similarly, the air intake duct 120 of the illustrated example provides airflow to the second engine 110. The example engines 108 and 110 of the illustrated example employ an afterburner. During flight, the example aircraft 100 may rotate about a roll axis 18, a pitch axis 20 and/or a yaw axis 22. For example, the aircraft 100 may rotate about the pitch axis 20 to enable the aircraft 100 to ascend or descend. Rotation of the example aircraft 100 about the axes 18, 20 and/or 22 may cause fluctuations in air mass flow rate at the inlet 118 of the first engine 108.

Figure 2:
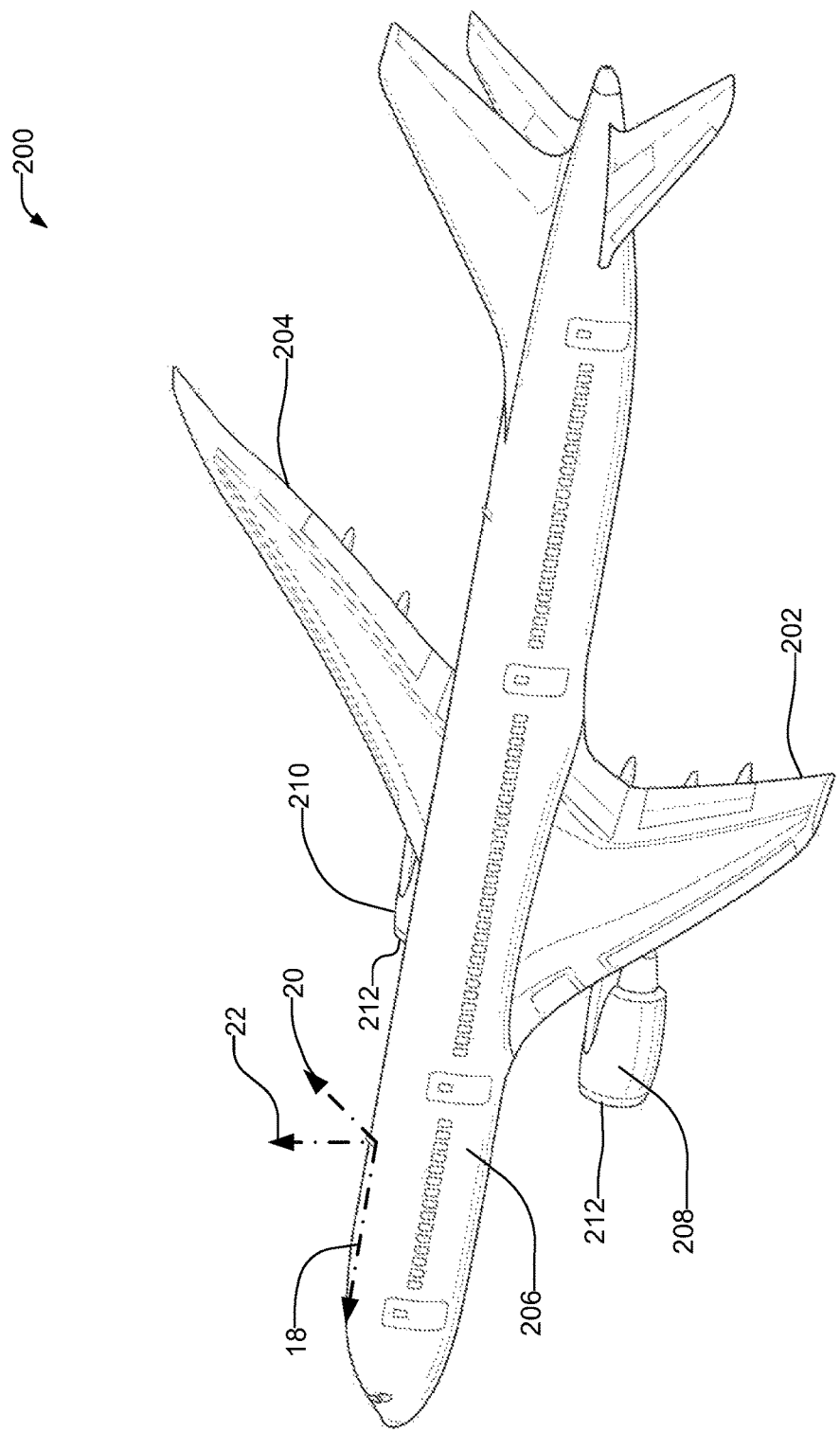
FIG. 2 is a perspective view of another example aircraft that may be implemented with the teachings disclosed herein.

FIG. 2 is a perspective view of another example aircraft 200 in which aspects of the present disclosure may be implemented. The example aircraft 200 of the illustrated example is a commercial aircraft having a first wing 202 and a second wing 204 extending from a fuselage 206. The aircraft 200 of the illustrated example includes a first engine 208 coupled to the first wing 202 and a second engine 210 coupled to the second wing 204. Each of the first and second engines 208 and 210 has an inlet 212 to receive airflow during operation. During flight, the example aircraft 200 may rotate about axes 18, 20 and/or 22. The aircraft 100 and 200 of FIGS. 1 and 2 are example aircraft and, thus, the example methods and apparatus disclosed herein may be implemented with other aircraft or vehicles without departing from the scope of this disclosure.

Figure 3:
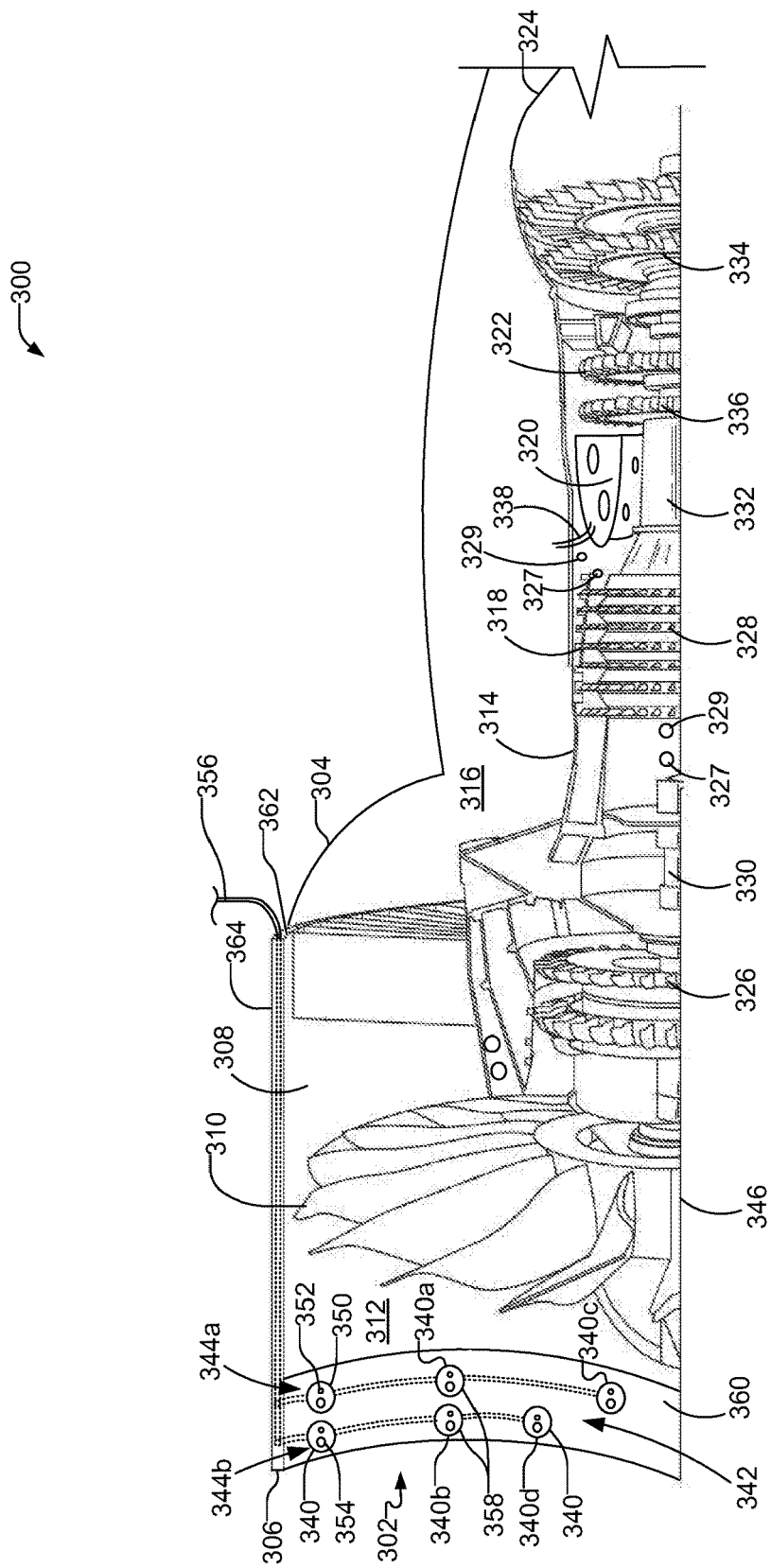
FIG. 3 is cross-sectional side view of an example engine constructed in accordance with the teachings disclosed herein.

FIG. 3 is partial cutaway view an example aircraft engine 300 (e.g., a turbofan jet engine) having a laser sensor system 302 constructed in accordance with the teachings disclosed herein. For example, the example aircraft engine 300 may implement the example engines 108 and 110 of the example aircraft 100 of FIG. 1 and/or the example engines 208 and 210 of the example aircraft 200 of FIG. 2. Referring to FIG. 3, the engine 300 of the illustrated example includes a housing or nacelle 304 that houses or surrounds components of the aircraft engine 300. For example, the nacelle 304 may include an inlet cowl 306, a fan cowl 308, a thrust reverser, an exhaust cone, an exhaust nozzle, and/or a pylon or strut to couple the aircraft engine 300 to a fuselage or a wing of an aircraft (e.g., the wings 202 or 204 of the example aircraft 200 of FIG. 2).

The engine 300 of the illustrated example is a gas turbine having a fan 310 that draws air into a duct, intake section and/or an inlet 312 (e.g., the air intake duct 114 of FIG. 1). Air flowing through the inlet 312 has an air mass flow rate that flows or moves through an engine core 314 and a bypass section 316 surrounding the engine core 314. The engine core 314 of the illustrated example includes a compressor 318, a combustion chamber 320, a turbine 322 and an outlet nozzle 324. The compressor 318 of the engine core 314 may include multiple compressor sections. For example, as shown, the compressor 318 of the illustrated example is a dual-axial compressor that includes a first compressor 326 and a second compressor 328. Additionally, each of the first and second compressors 326 and 328 of the illustrated example includes different compressor stages that progressively increase a pressure of air as the air flows from the inlet 312 to the combustion chamber 320 of the engine core 314. For example, the first compressor 326 of the illustrated example is a low-pressure compressor that provides relatively low pressure air and the second compressor 328 of the illustrated example is a high-pressure compressor that provides relatively high pressure air (e.g., air pressure greater than the air pressure provided by the low-pressure compressor). The first and second compressors 326 and 328 of the illustrated example are coupled to respective first and second shafts 330 and 332. The first shaft 330 is operatively coupled to a low-pressure turbine 334 and the second shaft 332 is operatively coupled to a high-pressure turbine 336.

After exiting the second compressor 328 (e.g., the high-pressure compressor), the highly pressurized air is provided to the combustion chamber 320, where fuel is injected via a fuel injector 338 and mixed with the highly pressurized air provided by the second compressor 328. The fuel/air mixture is then ignited in the combustion chamber 320. The high energy airflow exiting the combustion chamber 320 after combustion turns blades of the turbines 334 and 336, which are coupled to respective ones of the first and second shafts 330 and 332. Rotation of the first and second shafts 330 and 332 turns vanes of the first and second compressors 326 and 328. The heated air is exhausted via the outlet nozzle 324 where it mixes with cool air, provided by the fan 310 via the bypass section 316 that bypasses or flows around the engine core 314 to produce forward thrust. In some examples, the aircraft engine 300 may not include the bypass section 316 and all the air flowing through the air inlet flows through the engine core 314. The air mass flow-to-fuel mass flow ratio determines the amount of forward thrust produced by the aircraft engine 300.

The engine 302 of the illustrated example includes one or more pressure sensors 327 (e.g., pressure transducers) and/ or one or more temperature sensors 329 (e.g., thermocouples) positioned downstream from the fan 310 and/or the inlet 312. More specifically, the pressure sensors 327 and/or the temperature sensors 329 detect the pressure and temperature of the air at different locations downstream from the inlet 312 and upstream from the combustion chamber 320. The pressure and temperature information provided by the respective pressure and temperature sensors 327 and 329, along with other airdata information provided by an air data monitor system (e.g., a flight controller, a navigation system, etc.), may be used to determine airflow characteristics of the airflow in the compressor 314 to adjust an amount of fuel to be provided to the combustion chamber 320.

To determine the air mass flow rate at the inlet 312 of the aircraft engine 300, the engine 300 of the illustrated example employs the laser sensor system 302. The example laser sensor system 302 of the illustrated example measures or detects an air mass flow rate at an inlet of the aircraft engine 300. More specifically, the example laser sensor system 302 calculates or measures a mass of air that passes through a cross-sectional area of the inlet 312 over a period of time. In particular, the laser sensor system 302 detects air mass flow rate upstream from the fan 310 and/or the compressor 314. As discussed in greater detail below, the air mass flow provided by the laser sensor system 302 may be used to adjust a fuel flow rate to the combustion chamber 320 of the engine 302. In some examples, the example laser system 302 may replace the example pressure and temperature sensors 327 and 329 to determine air flow mass through the compressor 314 and/or to determine an amount of fuel to be provided to the combustion chamber 320. In some examples, the laser sensor system 302 may be used in conjunction with the example pressure and temperature sensors 327 and 329 to determine an amount of fuel to provide to the combustion chamber 320. In some examples, the example laser system 302 is a primary system to determine fuel flow rate to the combustion chamber 320 and the pressure and temperature sensors 327 and 329 provide a secondary system to provide fuel flow rate to the combustion chamber 320.

To detect or measure an air mass flow rate at the inlet of the example aircraft engine 300, the example laser sensor system 302 employs a laser sensor 340 (e.g., a LIDAR sensor). In the illustrated example, the laser sensor 340 is positioned or coupled to the inlet 312 (e.g., an inlet duct and/or the nacelle of the aircraft engine 300) upstream from the fan blade 310 of the aircraft engine 300. The laser sensor 340 of the illustrated example is a sensor array 342 that includes a plurality of laser sensors 340 radially spaced relative to a longitudinal axis 346 of the first shaft 330 and/or the aircraft engine 300. In particular, the sensor array 342 and/or laser sensors 340 of the illustrated example are positioned in ring pattern. In some examples, the laser sensors 340 are disposed in an arc-shaped pattern. In some examples, the sensor array 342 includes a plurality of rows (e.g., concentric arcs). As shown in the example of FIG. 3, the sensor array 342 of the illustrated example includes a first row of sensors 344a (e.g., an inner ring) radially positioned relative to the longitudinal axis 346 of the aircraft engine 300 and a second row of sensors 344b (e.g., an outer ring) radially spaced or positioned relative to the longitudinal axis 346 of the aircraft engine 300 adjacent the first row of sensors 344a. Other examples include other numbers of sensor arrays (e.g., 1, 3, 4, etc.). The first and second rows of sensors 344a and 344b of the illustrated example are provided radially about an entire circumference (e.g., 360 degrees) of the inlet 312. However, in some examples, the first row and/or the second row of sensors 344a and 344b may be positioned only on a segment or portion of a circumference of the inlet 312 (i.e., less than the entire circumference of the inlet 312). The first row of sensors 344a of the illustrated example is laterally spaced or positioned at a distance (e.g., between 1 inch and five feet) from the second row of sensors 344b. In addition, as shown in FIG. 3, a first sensor 340a of the first row of sensors 344a is aligned with a second sensor 340b from the second row of sensors 344b. A third sensor 340c of the first row of sensors 344a of the illustrated example is offset relative to a fourth sensor 340d of the second row of sensors 344b. In some examples, only the first row of sensors 344a may be employed. In some examples, only one laser sensor 340 may be employed.

The example sensors 340 of the illustrated example are laser radar sensors or transceivers (e.g., LIDAR sensors). Each of the laser sensors 340 of the illustrated example includes a housing 350 to house or support a laser transmitter 352 and a receiver 354. In the illustrated example, a fiber optic cable 356 communicatively couples the laser sensors 340 to a signal processor or logic circuit (e.g., as discussed below). In some examples, one or more covers (e.g., a transparent cover) may be positioned over the laser transmitter 352 and/or the receiver 354. The sensors 340 of the illustrated example are mounted within respective openings 358 formed in the inlet 312 (e.g., an inlet duct). More specifically, the laser sensors 340 of the illustrated example are flush mounted relative to an inner surface 360 (e.g., an aerodynamic surface) of the nacelle 304 adjacent the inlet 312 of the aircraft engine 300. In other words, the laser sensors 340 and/or a portion (e.g., a surface) of the sensors 340 define the inner surface 360 of the inlet 312. In some examples, the sensor array 342 is disposed on an aerodynamic surface of the aircraft engine 300 such that the sensor array 342 is substantially flush with and/or defines the aerodynamic surface. In this manner, the laser sensors 340 do not interfere, disrupt, modify and/or obstruct (e.g., a pattern or profile of) an airflow moving through the inlet 312 of the aircraft engine 300. In the illustrated example, only the laser transmitter 352 (e.g., an optical portion of the laser transmitter 352) and/or the receiver 354 (e.g., an optical portion of the receiver 354) are flush mounted or exposed relative to the inner surface 360 of the inlet 312. In examples in which the laser sensors 340 includes one or more covers, the one or more covers may be positioned over the openings 358 such that an outer surface of the cover is flush mounted relative to the inner surface 360 of the inlet 312.

The housing 350, any fasteners coupling the housing 350 to the nacelle 304, the fiber optic cable 356 and/or other components of the laser sensors 340 are positioned underneath or below the inner surface 360 of the inlet 312 and/or within the nacelle 304. For example, the housing 350, fasteners, the fiber optic cable 356 and/or other components of the laser sensors 340 of the illustrated example are positioned within a cavity or space 362 between the inner surface 360 of the inlet 312 and an outer surface 364 of the nacelle 304. In some examples, the laser sensors 340 may be offset (e.g., recessed or protruding) relative to the openings 358 and/or the inner surface 360 of the inlet 312. In the illustrated example, the inlet 312 is provided or defined by the intake cowl 306 of the nacelle 304. In some examples, the laser sensors 340 and/or the sensor array 342 may be coupled to a frame or rack (e.g., to the intake cowl 306), where the frame or rack is mounted to the nacelle 304 of the aircraft engine 300 such that the laser sensors 340 and/or sensor array 342 are positioned adjacent the inlet 312.

Figure 4:
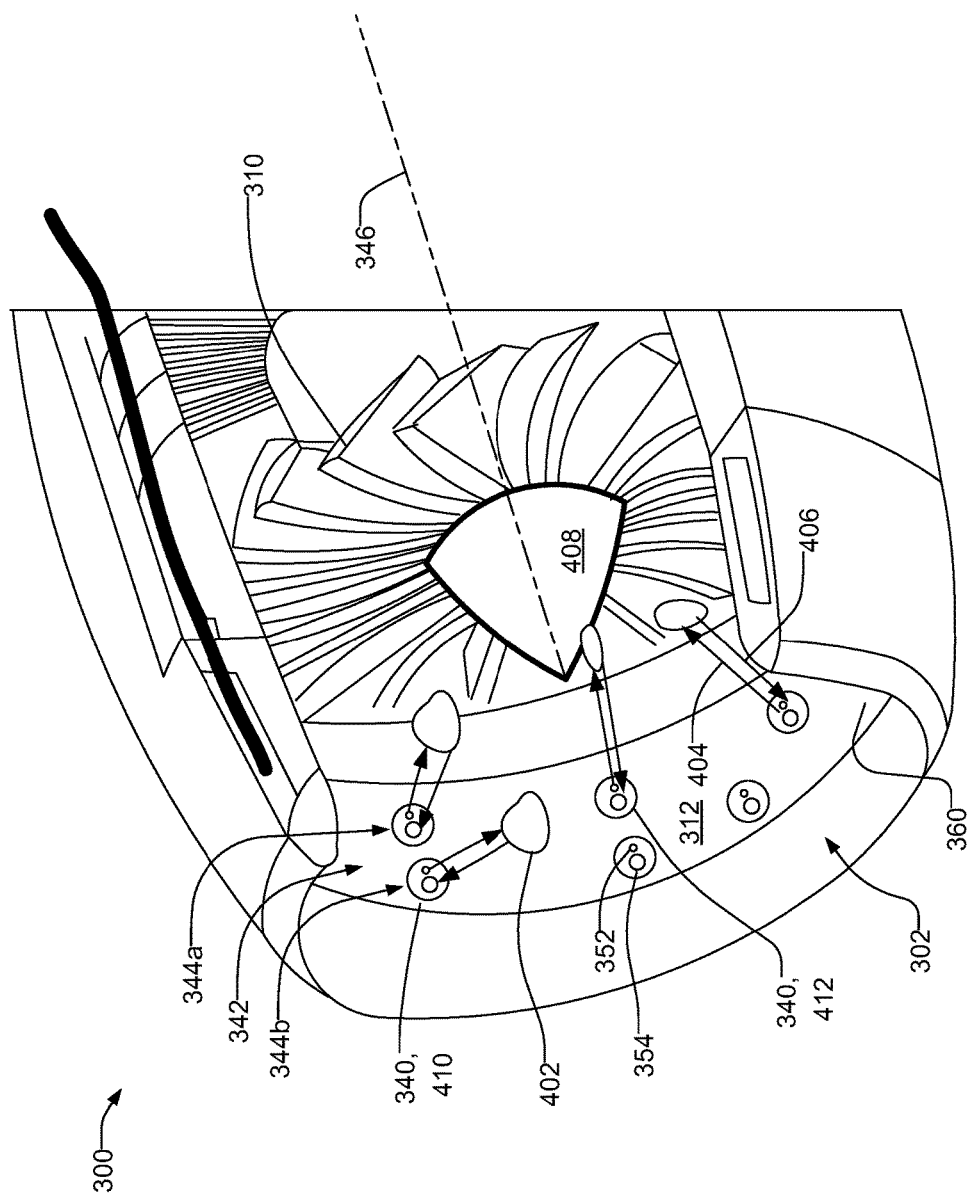
FIG. 4 is a perspective, partial cut-away view of the example engine of FIG. 3.

FIG. 4 is a partial perspective view of the example engine 300 of FIG. 3. In operation, the sensor system 302 of the illustrated example measures one or more characteristics of an airflow through the inlet 312 to determine or calculate mass air flow. For example, the sensor system 302 of the illustrated example determines or calculates mass air flow across an area defined by the inlet 312 (e.g., a cross-section of the inlet 312 taken along a plane perpendicular to the longitudinal axis 346, an area defined by a diameter of the inner surface 360 of the inlet 312, etc.). For example, to determine or calculate the air mass flow rate across an area of the inlet 312, the example sensor system 302 of the illustrated example provides and/or measures one or more characteristics of air flowing through the inlet 312. For example, the laser sensor 340 of the illustrated example characterizes or analyzes a volume of air and/or an air cloud 402 (e.g., air particles). For example, the air cloud 402 may be a colloid of fine solid particles or liquid droplets in the air. To characterize or analyze the air volume or the air cloud 402, the example laser sensor 340 generates or emits a laser beam or laser energy 404 (e.g., radiation, one or more wavelengths, etc.) from, for example, the transmitter 352. In some examples, the laser transmitter 352 of an example laser sensor 340 may be positioned or configured to direct the laser energy 404 (e.g., continuous or pulse) through an optical window that is substantially flush to the inner surface 360 or aerodynamic surface of the aircraft engine 300. In addition, the laser energy 404 does not interrupt or obstruct the airflow at the inlet 312 of the aircraft engine 300.

In some examples, the laser energy 404 is backscattered from the air cloud 402 (e.g., from an intersection of the air particles). For example, the laser energy 404 (e.g., wavelengths) is reflected or backscattered by the air particles (e.g., a particle in the air, a liquid droplet in the air, etc.) and the backscattered laser energy 406 is received by the receiver 354 of the laser sensor 340. In other words, the laser energy 404 from the transmitter 352 hits air particles and reflects back to the receiver 354.

During operation, a signal processor as described in greater detail below converts or conditions the backscattered laser energy 406 to generate electronic signals. The converted or conditioned backscattered laser energy 406 (e.g., electronic signals) is then processed or analyzed to determine one or more characteristics or parameters of the airflow through the inlet 312 based on the backscattered laser energy 406. This information provided by the sensor 340, for example, is processed by a signal processor to determine or measure a temperature of the air, a pressure of the air, a velocity of the air flowing though the inlet 312, a density of the air, mass flow rate of the air through the inlet 312 and/or other airflow characteristic(s). For example, data provided from the sensor 340 to the signal processor may include an aggregate of air particles in the volume of air 402 to determine air pressure, air temperature, air velocity, air density, and/or air mass flow rate through the inlet 312. Thus, a single sensor 340 receives the backscattered energy 406 to detect air pressure, air temperature, air velocity, air density, air mass flow rate, and/or other airflow characteristic(s) at the inlet 312. In some examples, the measured temperature, pressure and velocity characteristics of the air at the inlet 312 and/or a particular area of the inlet 312 are used to calculate an air mass flow rate across the inlet 312 and/or a cross-sectional area of the inlet 312.

Although the laser system 302 disclosed herein may employ only one sensor 340, the example laser system 302 of the illustrated example includes the sensor array 342. The sensor array 342 of the illustrated example detects or measures the airflow characteristics at a plurality of different locations along the inlet 312. For example, the laser energy 404 may be directed to a volume of air positioned near or at the inner surface 360, a cone 408 of the fan 310, and/or any other position, area or volume at the inlet 312 of the aircraft engine 300 (e.g., upstream from the blade 310). For example, the laser energy 404 of a first sensor 410 or sensor 340b (FIG. 3) may be directed or aimed toward the inner surface 360 of the nacelle 304 to detect one or more airflow characteristics (e.g., air pressure, air temperature, air velocity, air density, etc.) adjacent the inner surface 360, and the laser energy 404 of a second sensor 412 or sensor 340c (FIG. 3) may be directed or aimed toward the cone 408 to detect one or more airflow characteristics (e.g., air pressure, air temperature, air velocity, air density, etc.) adjacent the cone 408. Thus, in some examples, each of the sensors 340 of the sensor array 342 may detect airflow characteristics at different locations or portions of the inlet 312 and/or at different cross-sectional portions of the inlet 312. Thus, each of the sensors 340 in the first and second rows 344a and 344b detect airflow characteristics at different points, air volumes, and or locations across the inlet 312 of the engine 302. To enable the sensors 340 to direct the laser energy 404 at different locations, each sensor 340 may be angled or tilted at different angles relative to the housing 350, the inner surface 360 and/or relative to the other sensors 340.

As a result, the information provided by a first sensor 410 may be used in conjunction with information provided by the second sensor 412. For example, the airflow characteristic(s) provided by each of the sensors 340 can be used to map or graph overall airflow characteristics across substantially the entire cross-sectional area of the inlet 312. As a result, in some examples, airflow characteristics (e.g., air pressure, air temperature, air density, air mass flow, air velocity) provided by each of the sensors 340 of the sensor array 342 are processed or used to map a pattern or graph (e.g., pressure gradient pattern, airflow swirl pattern, an airflow pattern (e.g., laminar or turbulent flow), etc.) across the inlet 312 of the engine 302 (e.g., upstream from the blade 310). In some examples, when mapping the inlet 312 with the airflow characteristic(s) provided by each of the sensors 340, some of the data used to map the inlet 312 may be interpolated based on the measured data provided by one or more of the sensors 340 of the sensor array 342. For example, the first sensor 410 may be directed to the inner surface 360, the second sensor 412 may be directed to the cone 408, and data between the cone 408 and the inner surface 360 may be interpolated based on the data or values of the first and second sensors 410 and 412. As a result, the mapped data provided by the airflow characteristic(s) measured by the sensors 340 can determine, for example, air velocity and/or swirl information prior to that airflow reaching the combustion chamber 320 of the engine 302. In some examples, the sensors 344a may be used to determine a first airflow characteristic (e.g., velocity) and the sensors 344b may be used to determine a second airflow characteristic (e.g., pressure or temperature) different than the first airflow characteristic.

Although the examples shown in FIGS. 3 and 4 illustrate an array of sensors 340, the example laser system disclosed herein may be implemented with only one sensor 340. In some such examples, a predetermined table and/or map may be produced and data received by the single sensor 340 may be used to determine a map of the airflow conditions across the inlet 312 by comparing the airflow characteristics provided by the single sensor 340 and the predetermined table or map.

Example optical air data systems and methods that may be used to employ the example laser sensor system 302 disclosed herein are provided in U.S. Patent Publication 2009/0051896, U.S. Patent Publication 2010/0195100, U.S. Patent Publication 2009/0046289, and European Patent Publication EP1460266, which are all hereby incorporated herein by reference in their entireties.

Figure 5:
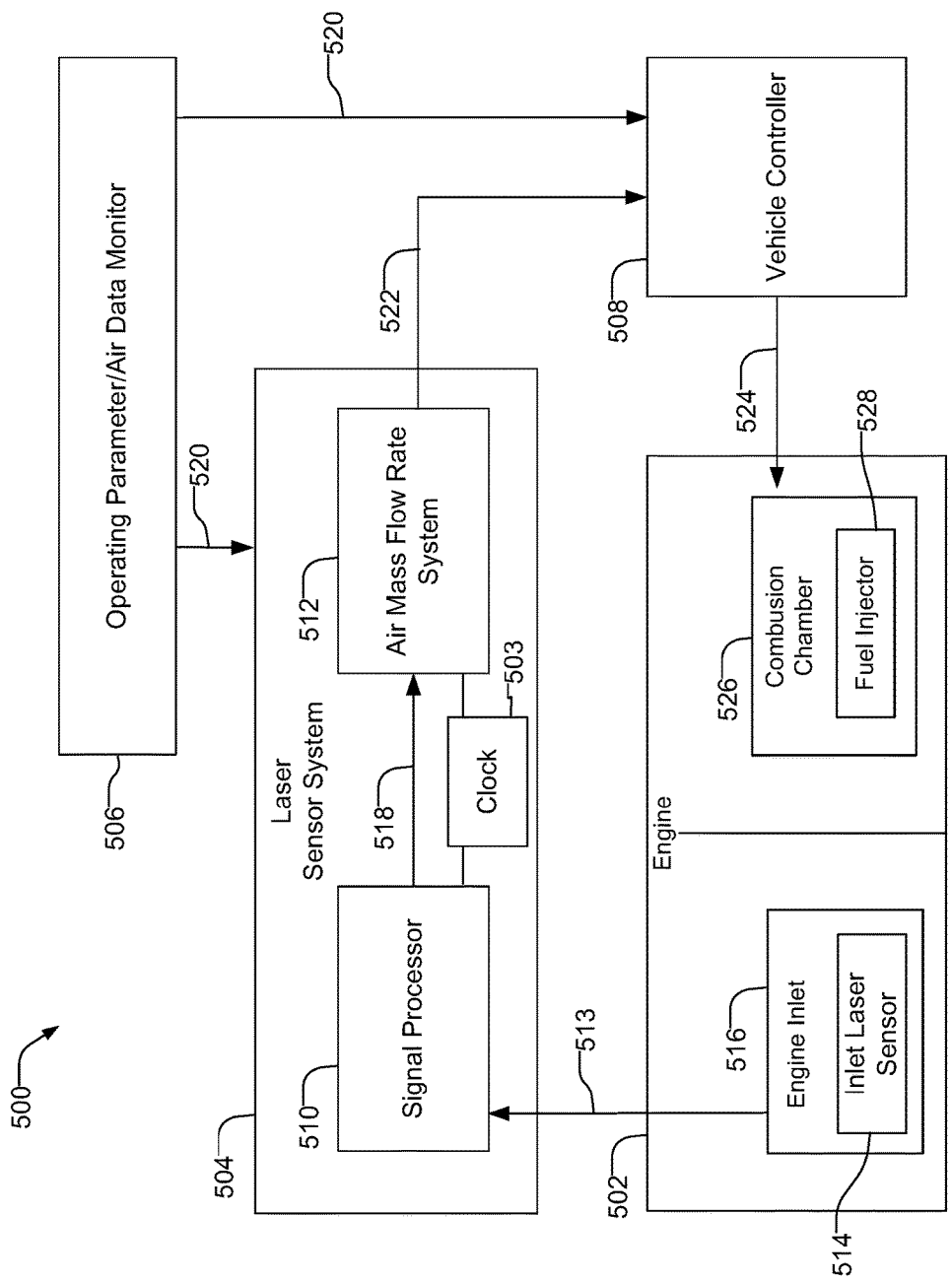
FIG. 5 is a block diagram of an example vehicle data system having an example laser sensor system in accordance with the teachings of this disclosure.

FIG. 5 is a schematic illustration of an example vehicle data system 500 of which examples disclosed herein may be implemented. In the illustrated example, the example vehicle data system 500 includes an engine 502, a laser sensor system 504, an operating parameter/air data monitor 506, and a vehicle controller 508. The engine 502 of the illustrated example may be an aircraft engine (e.g., a turbofan or turbojet engine, the example engines 108, 110, 204 and 206 of FIGS. 1 and 2, the example aircraft engine 300 of FIGS. 3 and 4, etc.), an automobile engine (e.g., an internal combustion engine), and/or any other engine that can be implemented with an example inlet laser sensor such as, for example, the laser sensor 340 of FIG. 3. The laser sensor system 504 of the illustrated example includes a signal processor 510 and an air mass flow rate system 512. The signal processor 510 of the illustrated example communicatively couples and/or receives one or more data or signals 513 (e.g., raw data) generated by an inlet laser sensor 514 positioned at an inlet 516 of the engine 502. In some examples the laser sensor system 504 may include a clock 503 to determine a time differential between two or more signals 513 (e.g., a time differential between two or more signals 513 generated from the backscattered laser energy 406 received by the inlet laser sensor 514). The inlet laser sensor 514 may include, for example, one or more of the laser sensors 340 and/or sensor arrays 342 of FIGS. 3 and 4. In some examples, the inlet laser sensor 514 may be communicatively coupled to the signal processor 510 via the fiber optic cable 356, a wireless system, a cellular system, etc. For example, the signal processor 510 of the illustrated example receives laser energy that is backscattered (e.g., the backscattered energy 406 of FIG. 4) from air particles and converts or conditions such backscattered laser energy to electronic signals 518. The signal processor 510 communicates the electronic signals 518 to the air mass flow rate system 512.

The air mass flow rate system 512 processes the electronic signals 518 provided by the signal processor 510 to generate processed data representative of airflow parameters or characteristics such as, for example, air pressure, air speed and/or velocity, air temperature, air density, etc. For example, the processed data may be indicative or representative of an air temperature, an air pressure, air density and/or an air velocity of airflow through a defined area (e.g., a cross-sectional area) at the engine inlet 516. The engine inlet 516 of the illustrated example may include a duct, the air intake duct 114 of FIG. 1, and/or any other structure to channel fluid (e.g., air) to the engine inlet 516. In addition, the air mass flow system rate system 512 is communicatively coupled to the operating parameter/air data monitor 506, which provides information or data 520 (e.g., air conditions) of the vehicle such as, for example, vehicle speed, an angle of attack of the vehicle, an altitude of the vehicle, static and/or dynamic air pressures, etc. The air mass flow rate system 512 calculates or estimates an air mass flow rate 522 at the engine inlet 516 based on the electronic signals 518 generated by the signal processor 510 and/or the data 520 provided by the operating parameter/air data monitor 506. In some examples, the laser sensor system 504 of the illustrated example provides telemetry for air vehicle flight control and/or vehicle navigation. In some examples, the air mass flow rate system 512 determines air mass flow from the raw data provided by the laser sensor 514.

The air mass flow rate system 512 is communicatively coupled to the vehicle controller 508 and communicates the determined or calculated air mass flow rate 522 to the vehicle controller 508. The vehicle controller 508 is also communicatively coupled to the operating parameter/air data monitor 506 and receives the data 520 from the operating parameter/air data monitor 506 to determine a mass fuel flow value based on the data 520 provided by the operating parameter/air data monitor 506 and the air mass flow rate 522 provided by the air mass flow rate system 522.

The vehicle controller 508 of the illustrated example controls operation of the engine 502 throughout its operating envelope. For example, the vehicle controller 508 may include a throttle position detector or a thrust lever position detector to determine an amount of power or thrust output that is required or commanded from the engine 502 of the example vehicle data system 500. Based on the data 520 provided by the operating parameter/air data monitor 506 (e.g., weight of the vehicle, altitude, vehicle speed, etc.) and a power or thrust output requirement detected by the throttle or the thrust lever position detector, the vehicle controller 508 determines a fuel-to-air ratio. For example, the fuel-to-air ratio may achieve a certain efficiency of the engine 502 based on the data 520 (e.g., flight or air conditions) provided by the operating parameter/air data monitor 506. The vehicle controller 508, after determining the fuel-to-air ratio, determines a fuel mass flow rate 524 to be supplied to a combustion chamber 526 of the engine 502. For example, the vehicle controller 508 modulates fuel flow by commanding a fuel injector 528 to inject fuel in the combustion chamber 526 in accordance with the fuel mass flow rate 524 that the vehicle controller 508 determined based on the fuel-to-air ratio and the air mass flow rate 522 provided by the air mass flow rate system 512.

While an example manner of implementing the vehicle data system 500 of FIG. 5 is illustrated in FIG. 5, one or more of the elements, processes and/or devices illustrated in FIG. 5 may be combined, divided, re-arranged, omitted, eliminated and/or implemented in any other way. Further, the example inlet laser sensor 514, the example laser sensor system 504, the example operating parameter/air data monitor 506, the example vehicle controller 508, and/or, more generally, the example vehicle data system 500 of FIG. 5 may be implemented by hardware, software, firmware and/or any combination of hardware, software and/or firmware. Thus, for example, any of the example the example inlet laser sensor 514, the example laser sensor system 504, the example operating parameter/air data monitor 506, the example vehicle controller 508, and/or, more generally, the example vehicle data system 500 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example inlet laser sensor 514, the example laser sensor system 504, the example operating parameter/air data monitor 506, the example vehicle controller 508, and/or, more generally, the example vehicle data system 500 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicle data system 500 of FIG. 5 may include one or more elements, processes and/or devices in addition to, or instead of, those illustrated in FIG. 5, and/or may include more than one of any or all of the illustrated elements, processes and devices.

Figure 6:
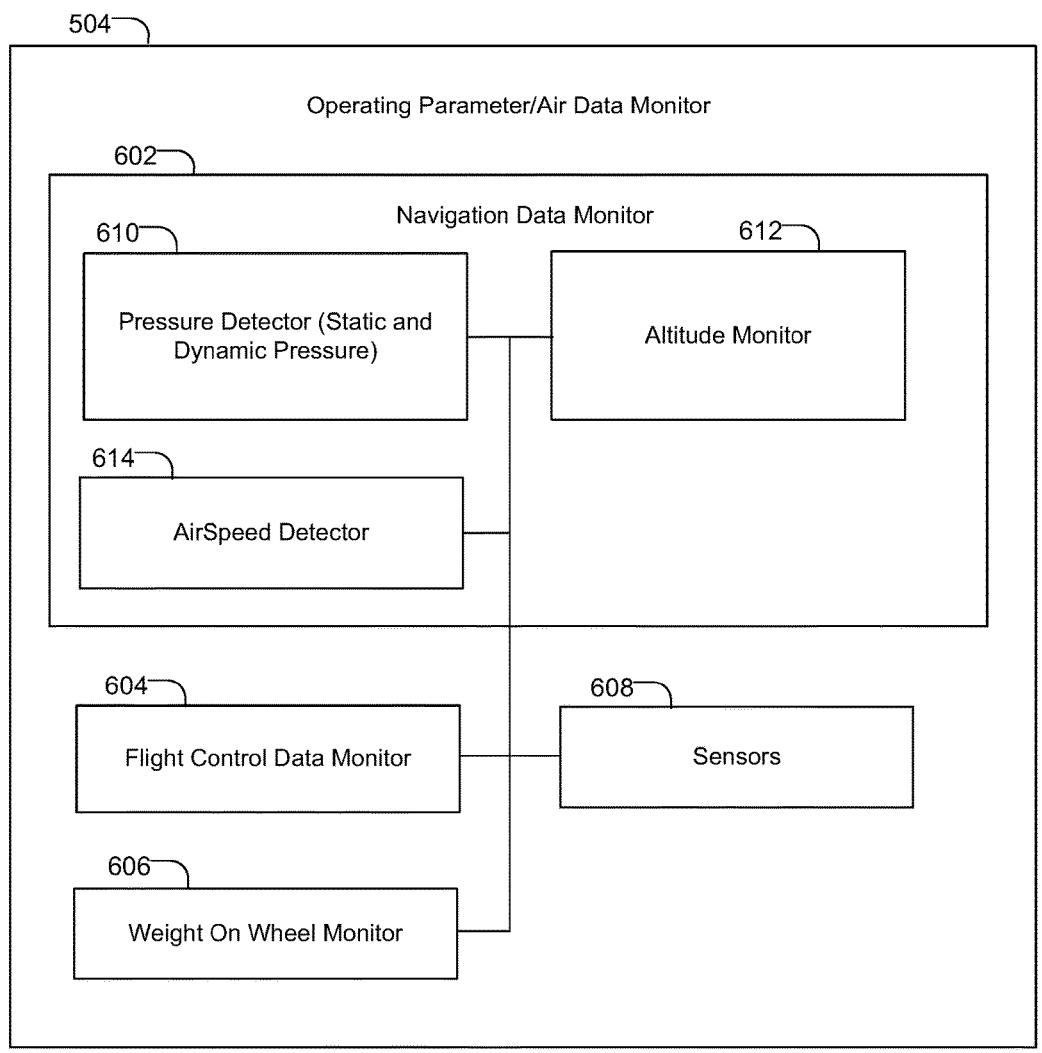
FIG. 6 is an example implementation of an example operating parameter/air data monitor of the example vehicle data system of FIG. 5.

FIG. 6 is a schematic illustration of an example implementation of the example operating parameter/air data monitor 506 of FIG. 5 that may be used to determine one or more flight conditions or characteristics of an aircraft and/or one or more characteristics of an airflow along an aircraft (e.g., the example aircraft 100 or 200 of FIGS. 1 and 2, etc.). For example, the example operating parameter/air data monitor 506 may include a processor to determine one or more aircraft flight conditions during a flight envelope of an aircraft such as, for example, airspeed of the aircraft, an angle of attack of the aircraft, a temperature of the air, altitude, etc.

The example operating parameter/air data monitor 506 of the illustrated example includes a navigation data monitor 602, a flight control data monitor 604, a weight on wheel monitor 606, and/or one or more sensors 608 communicatively coupled to the navigation data monitor 602, the flight control data monitor 604 and/or the weight on wheel monitor 606. In some examples, the navigation data monitor 602 provides air data and inertial reference information to an electronic flight instrument system display of an aircraft, the vehicle controller 508 of FIG. 5, the laser sensor system 504 of FIG. 5, and/or other systems on the aircraft such as engine systems, an autopilot system, the flight control data monitor 604, a landing gear system, etc. For example, airdata or flight conditions may include information such as airspeed (e.g., a speed of air flowing along an aircraft), a velocity of air flowing along an aircraft (e.g., an updraft, a downdraft, and/or a sidedraft), a temperature of the air surrounding an aircraft, an angle of attack of the aircraft, Mach number, barometric altitude data, ram air pressure and static pressure, air density, and/or other information and/or other flight conditions. The inertial reference may include and/or communicate with a positioning system (e.g., a Global Positioning System (GPS)), an accelerometer, etc., to provide information that may include, for example, a position of an aircraft, an angle of attack, attitude information (e.g., provided by an altimeter), etc. In some examples, the example operating parameter/air data monitor 506 may be implemented by an air data inertial reference system (ADIRS).

The navigation data monitor 602 of the illustrated example includes a pressure detector 610, an altitude monitor 612, and an airspeed detector 614 to determine the airdata or flight conditions. For example, the pressure detector 610 determines or measures ram pressure, static pressure and/or dynamic pressure of air flowing along an aircraft. For example, the pressure detector 610 receives signals from one or more pitot and static pressure sensors and converts those signals to values representative of a pressure of the air. The altitude monitor 612 of the illustrated example determines an altitude of the aircraft during a flight envelope or path of the aircraft. For example, the altitude monitor 612 receives a signal from an altimeter and converts the signal to a value (e.g., barometric altitude value) representative of an altitude at which the aircraft is flying. In some examples, the airspeed detector 614 determines or calculates airspeed based on the measured ram air and static pressure values provided by the pressure detector 610.

The flight control data monitor 604 of the illustrated example adjusts one or more flight control mechanisms of an aircraft. In some examples, based on one or more of the flight conditions (e.g., airspeed of the aircraft, velocity of air, etc.), the flight control data monitor 604 adjusts or moves a flight mechanism (e.g., a spoiler, a flap, a trim, an elevator, a rudder, a slat, an aileron, etc.) and/or other flight control mechanism. For example, based on a velocity of the air flowing along the aircraft, one or more flight control mechanisms may be adjusted to decrease and/or minimize turbulence and/or slip of an aircraft. In some examples, the flight control mechanisms are adjusted to substantially maintain a heading of the aircraft, decrease turbulence or slip, increase fuel efficiency, conserve fuel, manage loads applied to the aircraft, and/or to control other flight characteristics of the aircraft.

To determine if the aircraft is taxing or in flight, the operating parameter/air data monitor 504 of the illustrated example includes the weight on wheel monitor 606. For example, when a landing gear of an aircraft is deployed and engaged with a ground, the weight on wheel monitor 606 detects or determines a weight being supported by wheels via a sensor to determine when the aircraft is taxing.

Figure 7:
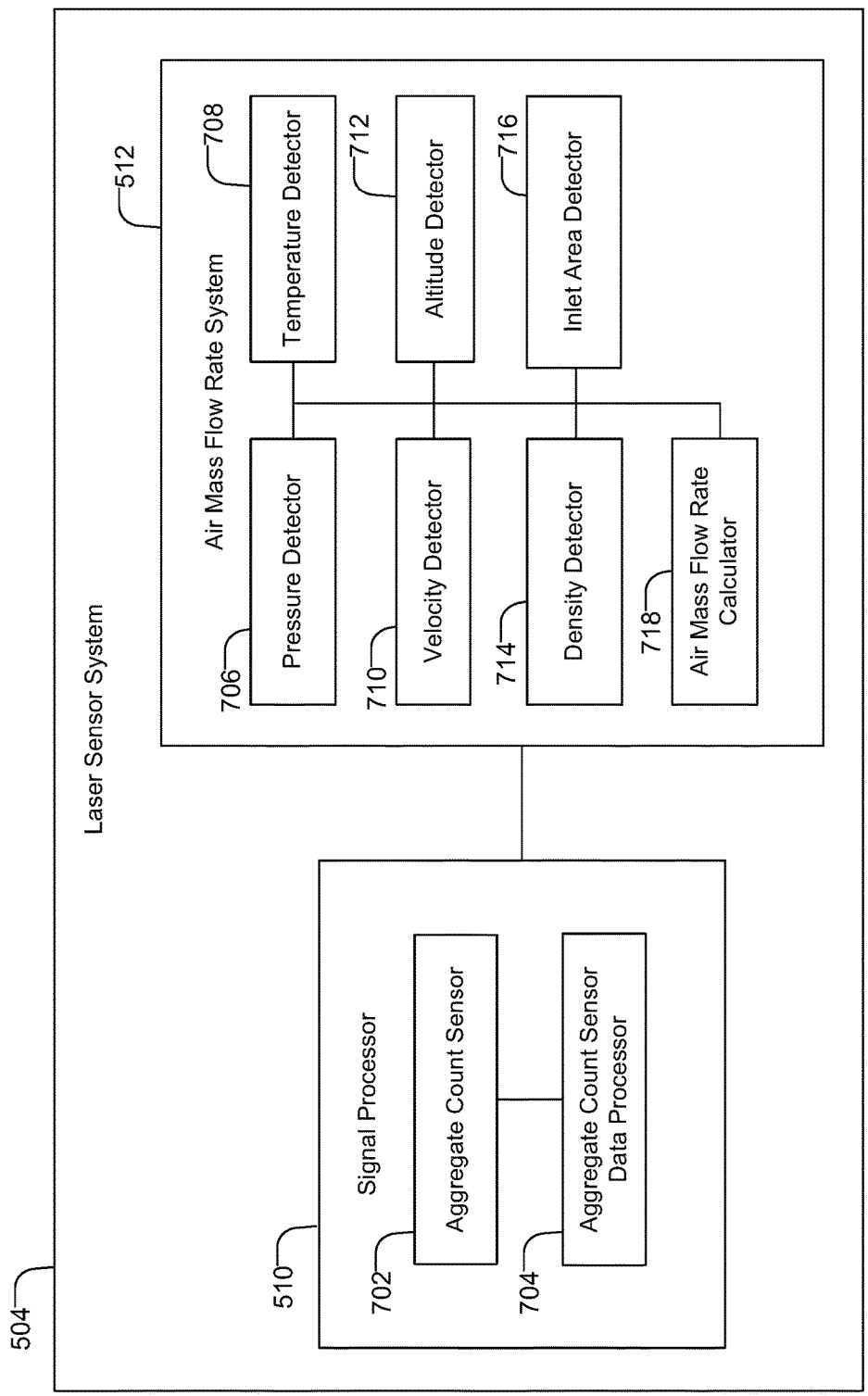
FIG. 7 is an example implementation of an example laser sensor system of the example vehicle data system of FIG. 5.

FIG. 7 is a schematic illustration of an example implementation of the example laser sensor system 504 of FIG. 5. The example signal processor 510 of the illustrated example includes an aggregate count sensor 702 and an aggregate count sensor data processor 704. The aggregate count sensor 702 of the illustrated example receives the signals 513 from the inlet laser sensor 514 of FIG. 5. The signals 513 provided by the inlet laser sensor 514 may be data (e.g., raw data) relating to, for example, the number or size of atoms or particles in a given or measured volume of air (e.g., the air cloud 402 of FIG. 4) and/or other information provided by the backscattered laser energy 406 and/or the signals 513 described above in connection with FIGS. 4 and 5. The aggregate count sensor 702 communicates the signals 513 to the aggregate count sensor data processor 704. The example aggregate count sensor data processor 704 converts such information to computer processable electronic signals 518 that may be used to determine the desired characteristics or parameters of the air flowing through the engine inlet 516. For example, the aggregate count sensor data processor 704 may include, for example, an analog to digital (A/D) converter and/or an optical transducer to convert the data from the inlet laser sensor 514 to the electronic signals 518 (e.g., digital electronic signals). The aggregate count sensor 702 communicates the electronic signals 518 representative of the signals 513 generated by the inlet laser sensor 514 to the example air mass flow rate system 512. For example, the aggregate count sensor data processor 704 communicates the electronic signals 518 via the fiber optic cable 356, a wireless connection, a cellular connection, and/or any other suitable communication system(s). In some examples, the aggregate count sensor 702 and/or the aggregate count sensor data processor 704 may be communicatively coupled to receive information provided by the pressure and/or temperature sensors 327 and 329 of FIG. 3.

The example air mass flow rate system 512 of the illustrated example includes a pressure detector 706, a temperature detector 708, a velocity detector 710, an altitude detector 712, a density detector 714, an inlet area detector 716 and an air mass flow rate detector or calculator 718. The pressure detector 706 of the illustrated example receives the electronic signals 518 from the aggregate count sensor data processor 704 and processes the electronic signals 518 to determine a pressure of air flowing through the engine inlet 516 (e.g., the inlet 312 of FIG. 3). The temperature detector 708 of the illustrated example receives the electronic signals 518 from the aggregate count sensor data processor 704 and processes the electronic signals 518 to determine a temperature of air flowing through the engine inlet 516. For example, the pressure detector 706 and the temperature detector 708 analyze a wavelength graph (e.g., a line thickness, a magnitude, etc.) and/or measure an intensity of the detected backscattered laser energy 406 to determine the pressure and/or the temperature of the air flowing through the engine inlet 516. In some examples, the temperature detector 708 determines an air temperature based on a measured size (e.g., a diameter) of an air particle detected by the backscattered laser energy 406.

The velocity detector 710 of the illustrated example receives the electronic signals 518 from the aggregate count sensor data processor 704 and processes the electronic signals 518 to determine a velocity and/or airspeed of air flowing through the engine inlet 516. For example, the velocity detector 710 processes the electronic signals 518 using algorithms applying a Doppler velocity equation to determine air speed and/or velocity from a frequency shift analysis.

The density detector 714 of the illustrated example processes the electronic signals 518 to determine a density of air flowing through the engine inlet 516. In some examples, the density detector 714 retrieves the pressure and the temperature values of the air from the pressure detector 706 and the temperature detector 708 and uses those values to determine the density of the air through the engine inlet 516. Additionally or alternatively, in some examples, the density detector 714 retrieves altitude information from the navigation data monitor 602 to determine the density of the air. In some examples, the density detector 714 retrieves altitude information from the navigation data monitor 602 to determine (e.g., select) a density equation based on the altitude information received from the navigation data monitor 602.

In some examples, the air mass flow rate system 512 determines one or more characteristics (e.g., pressure, temperature, density) of the air by matching and/or comparing the electronic signals 518 and/or processed data to experimentally determined air characteristics (e.g., density, pressure, temperature, particle size, etc.). For example, the pressure detector 706, the temperature detector 708, the velocity detector 710, and/or the density detector 714 may retrieve stored information from a look-up table to compare, via a comparator, the electronic signals 518 provided by the aggregate count sensor data processor 704 with stored values in a look-up table to determine pressure, temperature, velocity and/or density of the air.

The inlet area detector 716 retrieves information from, for example, a look-up table or the operating parameter/air data monitor 506, where this information is representative of an area at the engine inlet 516 through which the air is flowing and/or an area of the engine inlet 516 from which the electronic signals 518 were generated. In some examples, an area of the engine inlet 516 is a predetermined value, which is determined based on a model and/or type of engine employed by an aircraft.

The air mass flow rate calculator 718 calculates the air mass flow rate of air flowing through the engine inlet 516 and/or a cross-sectional area of the engine inlet 516. For example, the air mass flow rate calculator 718 determines air mass flow rate based on a density determined by the density detector 714, a cross-sectional area determined by the inlet area detector 716 and a velocity determined by the velocity detector 710. An air mass flow rate may be determined using the following equation:

$$m = \rho V A \qquad \text{Equation 1:}$$

In equation 1, p is the density of the air flowing through the engine inlet 516 that, in some examples, is based on a measured pressure and a measured temperature of air provided by the respective pressure and temperature detectors 706 and 708, V is the velocity of the air flowing through the engine inlet 516, and A is an area of the engine inlet 516 through which the air is flowing and analyzed by the inlet laser sensor 514. The air mass flow rate system 512 communicates the air mass flow rate 522 to the vehicle controller 508. In some examples, the air mass flow calculator 718 determines the air mass flow rate through the engine inlet 516 based on the signals 513 provided by the laser sensor 514. For example, the air mass flow calculator 718 receives the electronic signals 518 from the aggregate count sensor 702 and processes the electronic signals 518 to determine mass flow rate of the air flowing through the engine inlet 516.

Figure 8:
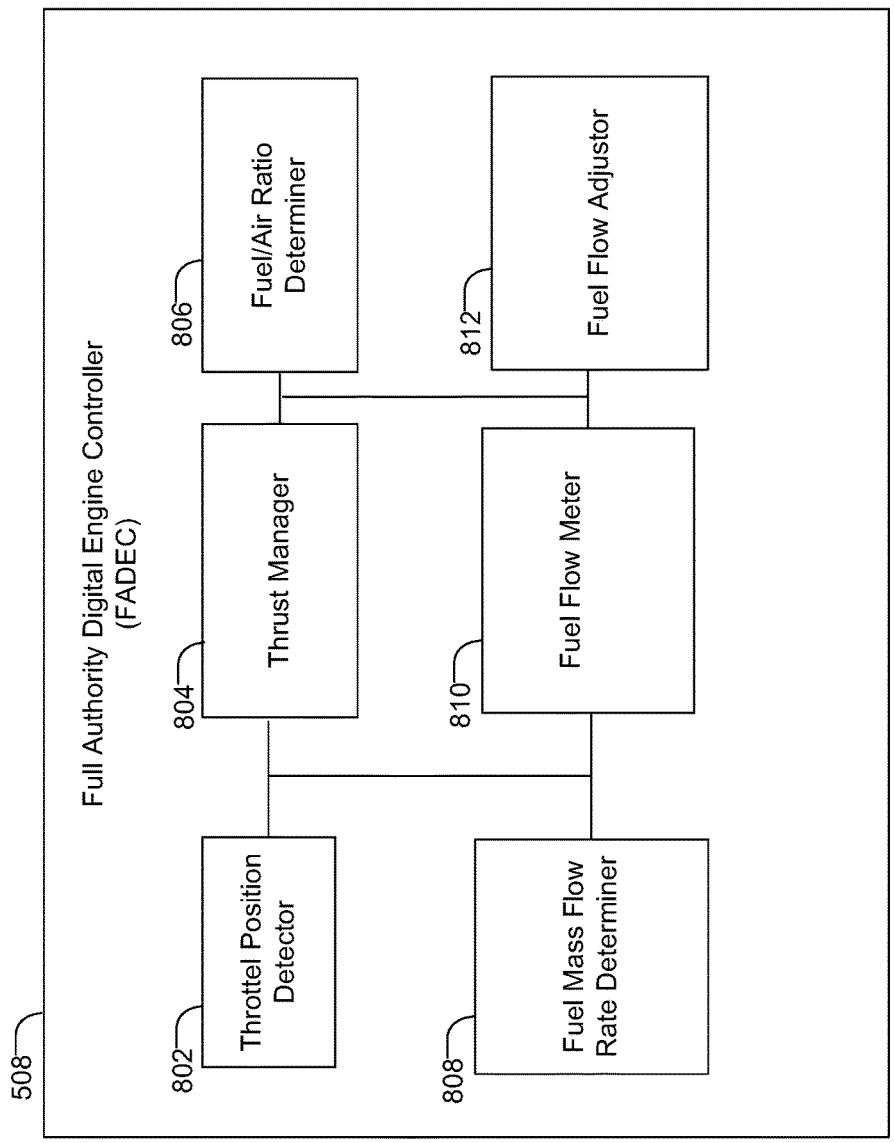
FIG. 8 is an example implementation of an example vehicle controller of the example vehicle data system of FIG. 5.

FIG. 8 is a schematic illustration of an example implementation of the example vehicle controller 508 of FIG. 5. For example, the example vehicle controller 508 of the illustrated example is a full authority digital engine controller or FADEC. The FADEC provides optimum engine efficiency for a given flight condition. For example, the vehicle controller 508 of the illustrated example modulates a fuel flow rate to the combustion chamber 526 of the engine 502 in response to inputs from sensors and measurements of engine operating conditions (e.g., engine temperatures, exhaust velocity, etc.) and/or aircraft flight conditions (air pressure, air density, air speed, etc.).

The example vehicle controller 508 of the illustrated example includes a throttle position detector 802, a thrust manager 804, a fuel-to-air ratio determiner 806, a fuel mass flow rate determiner 808, a fuel flow meter 810 and a fuel flow adjustor 812. The throttle position detector 802 of the illustrated example detects a thrust command based on a position of a throttle lever. For example, a pilot of an aircraft may position a throttle lever at different angles or positions that correspond to a desired thrust to be output by the engine 502. For example, the position of the throttle may correspond to a desired speed of the fan 310 (FIG. 3) of the example engine 300 of FIG. 3.

The thrust lever position detector 802 communicates the thrust lever position to the thrust manager 804. The thrust manager 804 of the illustrated example determines or receives information from the operating parameter/air data monitor 506 to adjust or schedule a corrected thrust based on measured air parameters or characteristics, aircraft data or characteristics and/or other information to achieve the desired thrust set by the throttle lever and/or achieve a desired efficiency of the engine 502. For example, for any given Mach number, air pressure and/or air temperature, the thrust manager 804 computes a fan speed to achieve the thrust corresponding to the thrust lever position detected by the thrust lever position detector 802. The fan speed information is communicated to the fuel-to-air ratio determiner 806.

The fuel-to-air ratio determiner 806 of the illustrated example determines a fuel-to-air ratio, which varies continually during a flight and/or for any given operating condition of the engine 502. For example, the fuel-to-air ratio determiner 806 may determine a fuel-to-air ratio based on an operating condition of the engine (e.g., taxiing, take-off, cruise, landing, maneuvering, etc.). In some examples, the fuel-to-air ratio determiner 806 may be retrieved from a look-up table based on measured or detected flight conditions and/or air data parameters provided by, for example, the operating parameter/air data monitor 506. In some examples, the fuel-to-air ratio may be based on a density of air, which varies with altitude. In some examples, the fuel-to-air ratio is determined based on a calculated thrust, ram drag, weight of the aircraft, core airflow, thrust specific fuel consumption value (TSFC), that are calculated based on input variables such as, for example, speed or Mach, altitude, air pressure, and/or air temperature of the air (e.g., along the aircraft and/or in the engine 502 (e.g., the engine core 314)). When the fuel-to-air ratio determiner 806 determines the fuel-to-air ratio for a given flight condition and/or operating condition, the fuel-to-air ratio determiner 806 communicates the fuel-to-air ratio to the fuel mass flow rate determiner 808.

The fuel mass flow rate determiner 808 of the illustrated example receives the air mass flow rate 522 from the air mass flow rate detector 718 and the fuel-to-air ratio from the fuel-to-air ratio determiner 806. The fuel mass flow rate determiner 808 of the illustrated example calculates or determines the amount of fuel mass flow rate 524 to provide to the combustion chamber 526 based on the fuel-to-air ratio determined by the fuel-to-air ratio determiner 806 and the air mass flow rate 522 determined by the air mass flow rate calculator 512. In some examples, the fuel mass flow rate determiner 808 and/or the vehicle controller 502 may also receive information from the pressure and/or temperature sensors 327 and 329 when determining the fuel-to-air ratio.

The fuel flow meter 810 of the illustrated example controls and supplies fuel to the fuel injector 528 at a desired pressure and fuel mass flow rate 524 provided by the fuel mass flow rate determiner 808. For example, the fuel flow meter 810 measures a fuel flow rate to the combustion chamber 526. The fuel flow meter 810 compares (e.g., via a comparator) the measured fuel flow supplied the combustion chamber 526 with the fuel mass flow rate 524 determined by the fuel mass flow rate determiner 808. The fuel flow meter 810 commands a fuel flow adjustor 812 (e.g., a valve controller) to adjust (e.g., increase or decrease) a fuel flow rate provided by the fuel injector 528 to the combustion chamber 526 to achieve the fuel mass flow rate 524 determined by the fuel mass flow rate determiner 808.

By measuring an air mass flow rate at the engine inlet 516, the example vehicle data system 500 of FIG. 5 and/or the example systems of FIGS. 6-8 significantly increase an efficiency of an engine such as, for example, an aircraft engine during at least a portion of a flight envelope of an aircraft (e.g., taxing, take-off, cruise, and/or landing). Additionally, the example vehicle data system 500 significantly reduces or eliminates flameout occurrences due to, for example, aircraft maneuvers that cause a decreased air mass flow rate through the engine inlet 516. For example, the fuel flow meter 810 of the illustrated example adjusts (e.g., decreases) the fuel mass flow rate 524 to the combustion chamber 526 to reduce flameout occurrences because the fuel mass flow rate determiner 808 of the illustrated example determines the fuel mass flow rate 524 based on the air mass flow rate 522 at the engine inlet 516 and the fuel-to-air ratio provided by the fuel-to-air ratio determiner 806.

Figure 9:
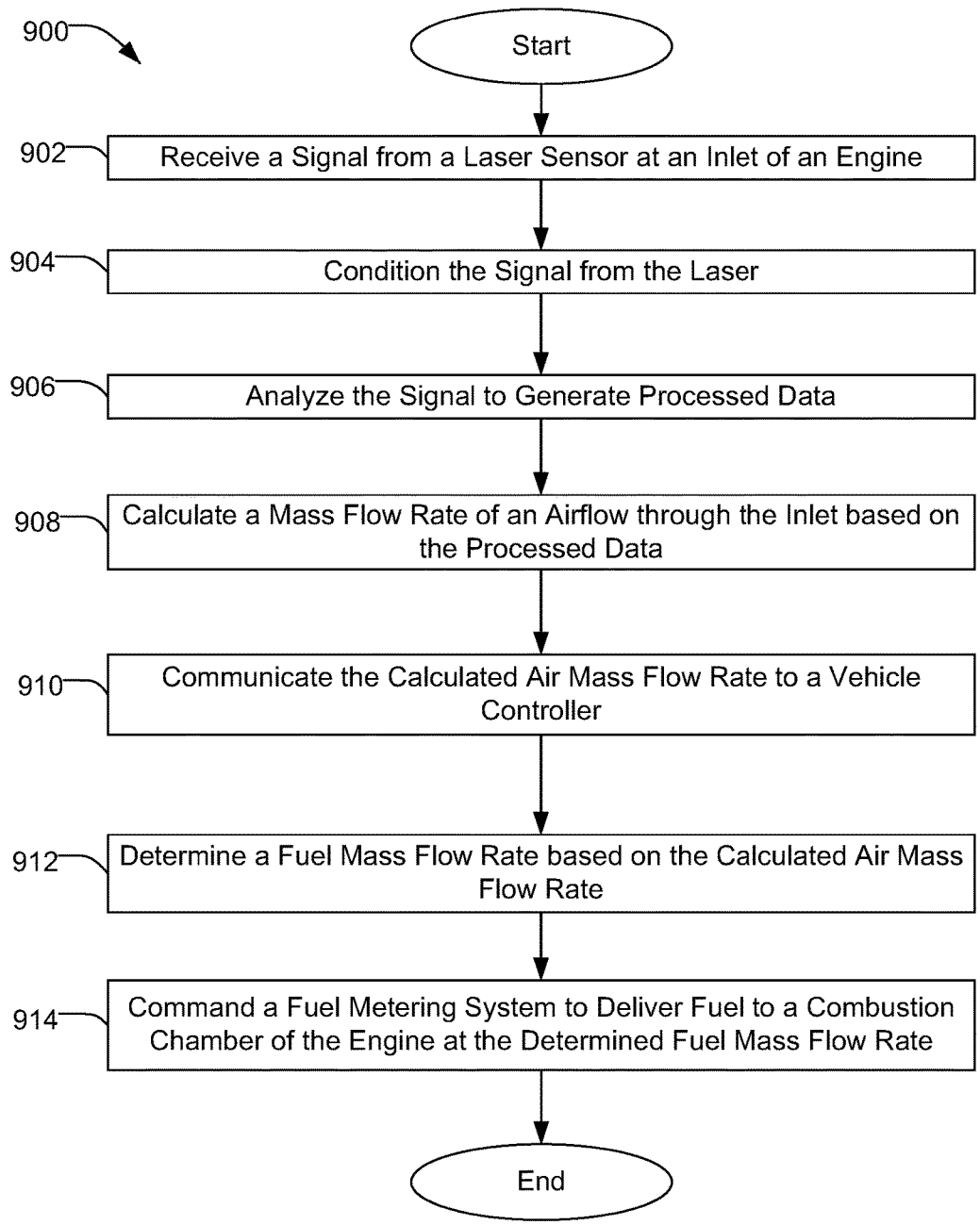
FIG. 9 is a flowchart representative of an example method that may be used to implement the example systems of FIGS. 5-8.

A flowchart representative of a method that may be used to implement the example systems of FIGS. 5-8 is shown in FIG. 9. In the illustrated examples, the methods may be implemented using machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIG. 9 many other methods of implementing the example systems of FIGS. 5-8. For example, the order of execution of the blocks may be changed, and/or some of the blocks described may be changed, eliminated, or combined.

As mentioned above, the example method of FIG. 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example method of FIG. 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The example method 900 of FIG. 9 begins at block 902 with the laser sensor system 504 receiving the signals 513 from the inlet laser sensor 514 positioned at the engine inlet 516 of the engine 502. For example, the signal processor 510 of the example laser sensor system 504 receives the signals 513 (e.g., raw data). In the illustrated example, the example signal processor 510 conditions the signals generated by the inlet laser sensor 514 (block 904). For example, the signal processor 510 may convert an analog signal 513 received from the inlet laser sensor 514 (e.g., signals representative of the backscattered laser energy 406) to the electronic signals 518 (e.g., digital signals) that can be processed by a processor such as, for example, the aggregate count sensor data processor 704, the processor 1012 of FIG. 11, etc. The signal processor 510 communicates the conditioned electronic signal 518 to the air mass flow rate system 512.

The example air mass flow rate system 512 analyzes the conditioned signal to generated processed data (block 906). For example, the air mass flow rate system 512 may analyze the conditioned electronic signals 518 to determine processed data such as, for example, air parameters including for example air pressure, air temperature, air density, air speed or velocity, and/or any other air parameter(s) or characteristic(s). In some examples, the air mass flow rate system 512 may retrieve air data characteristics (e.g., altitude) from the operating parameter/air data monitor 506, a look-up data stored in memory, and/or any other system of a vehicle (e.g., an aircraft). In some examples, the example air mass flow rate system 512 of the illustrated example retrieves an altitude value from the operating parameter/air data monitor 506 to determine a density equation to utilize when the air mass flow rate system 512 determines the air mass flow rate 522.

The air mass flow rate system 512 of the illustrated example determines or calculates the air mass flow rate 512 of the air flowing at or through the engine inlet 516 based on the processed data. (block 908). For example, the air mass flow rate system 512 of the illustrated example determines or calculates the air mass flow rate 522 based on the air temperature value, air pressure value, and the air velocity value provided by the respective pressure detector 706, temperature detector 708 and the velocity detector 710, and/or the processed data at block 906. The air mass flow rate system 512 communicates the calculated air mass flow rate 522 to the vehicle controller 508 (block 910). The vehicle controller 508 determines a fuel mass flow rate 524 based on the calculated air mass flow rate 522 and a fuel-to-air ratio (block 912). For example, the vehicle controller 508 may determine the fuel-to-air ratio via the fuel-to-air ratio determiner 806, from a look-up table and/or may determine a fuel-to-air ratio from data provided by the operating parameter/air data monitor 506 and/or any other control system. The vehicle controller 508 then commands a fuel metering system (e.g., the fuel flow meter 810) to provide the determined fuel mass flow rate 524 to the combustion chamber 526 of the engine 502 (block 914).

Figure 10:
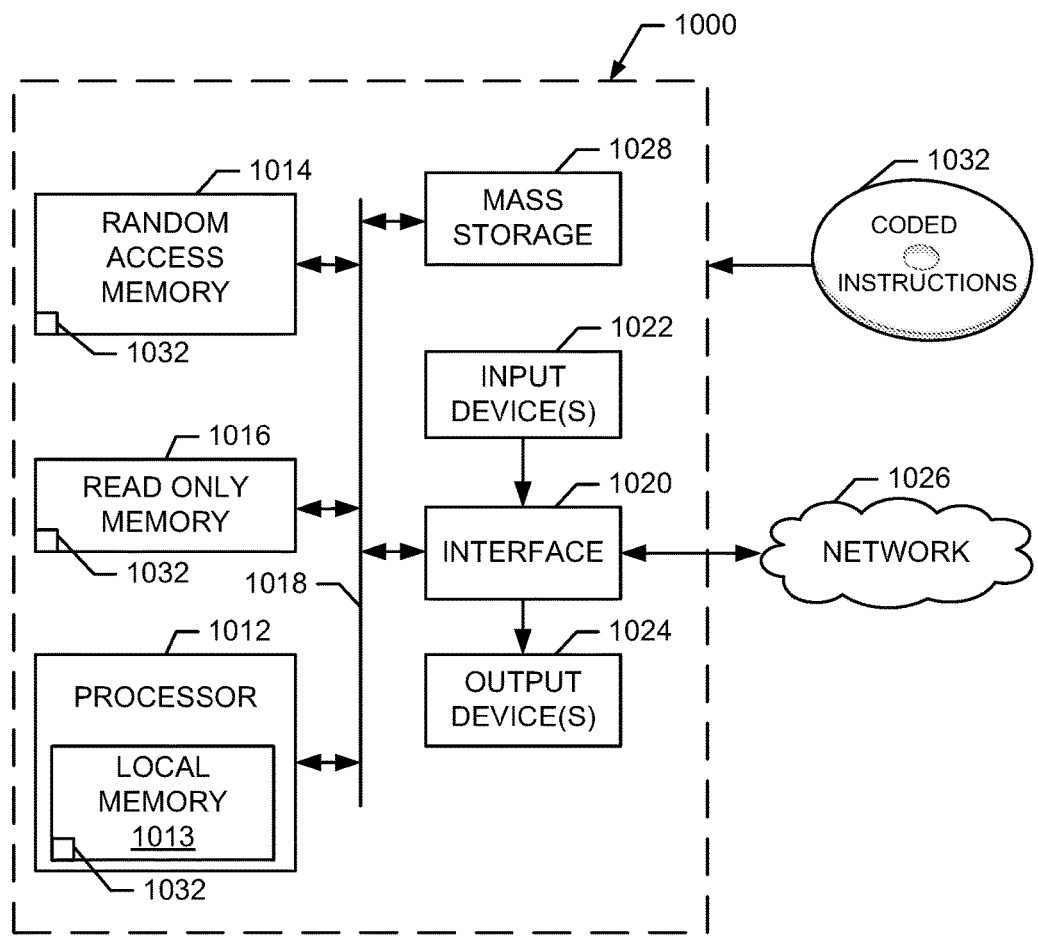
FIG. 10 is a block diagram of an example processor platform 1000 capable of executing the method of FIG. 9 to implement the systems of FIGS. 5-8.

FIG. 10 is a block diagram of an example processor platform 1000 capable of performing the example method 900 of FIG. 9 to implement the example apparatus of FIGS. 6-8. The processor platform 1000 can be, for example, a server, a flight control computer, a mobile device (e.g., a cell phone, a smart phone, a tablet such as an iPad™), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a cockpit instrument (e.g., a gauge and/or indicator) a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 to implement the method 900 of FIG. 9 may be stored in the mass storage device 1028, in the volatile memory 1014, in the non-volatile memory 1016, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   providing a frame having an inner surface and an opening therethrough to define a passageway;
   mounting laser sensors to the inner surface of the frame, the laser sensors to measure a characteristic of a fluid that is to flow through the passageway of the frame; and
   mounting the frame to an engine upstream from a compressor of the engine, the passageway to define an inlet of the engine when the frame is coupled to the engine.

2. The method of claim 1, further including radially spacing the laser sensors about the inner surface relative to a longitudinal axis of the opening defined by the frame.

3. The method of claim 2, wherein the laser sensors include a first row of sensors and a second row of sensors, further including radially positioning the first row of sensors and the second row of sensors relative to the longitudinal axis.

4. The method of claim 1, further including flush mounting the laser sensors relative to the inner surface of the frame to prevent the laser sensors from obstructing airflow through the passageway.

5. The method of claim 1, wherein the engine includes an aircraft engine, and further including positioning the laser sensors on a nacelle of the aircraft upstream from a fan of the engine.

6. The method of claim 1, further including measuring, via the laser sensors, at least one of a pressure characteristic, a temperature characteristic or a velocity characteristic of an airflow through the passageway.

7. The method of claim 6, further comprising communicatively coupling the laser sensors to a processor and determining, via the processor, a fuel/air ratio value and an air mass flow rate based on the at least one of the pressure characteristic, the temperature characteristic or the velocity characteristic.

8. The method of claim 7, further including determining, via the processor, a fuel mass flow rate based on the fuel/air ratio and the air mass flow rate.

9. A method for use with an engine comprising:
mounting a laser sensor to an inner surface of a duct; and
coupling the duct to an engine upstream from an air intake of the engine, the duct to define an inlet of the engine when the duct is coupled to the engine, the laser sensor to measure a mass flow rate of airflow passing through the inlet when the duct is coupled to the engine irrespective of airflow characteristics downstream from the air intake.

10. The method of claim 9, further including flush mounting the laser sensor relative to the inner surface of the inlet.

11. The method of claim 9, further comprising additional laser sensors, and positioning the laser sensors in a ring pattern relative to a longitudinal axis of the duct.

12. The method of claim 9, further including forming the duct with a circular cross-section.

13. The method of claim 9, further including positioning the duct adjacent the inlet upstream from a compressor of the engine, and measuring, via the sensors, the mass flow rate of the airflow at the inlet.

14. The method of claim 13, further including adjusting another characteristic in response to the mass flow rate of the airflow measured at the inlet.

15. An apparatus for use with an aircraft engine comprising:
a frame mountable to a nacelle of the aircraft engine, the frame having a passageway to define an inlet of the aircraft engine, the frame to be positioned upstream from a fan of the aircraft engine; and
laser sensors coupled to a frame, the laser sensors being radially spaced relative to a longitudinal axis of the aircraft engine, the laser sensors to measure at least one of a pressure characteristic, a temperature characteristic or a velocity characteristic of an airflow moving through the passageway.

16. The apparatus of claim 15, wherein the laser sensors include a LIDAR sensor.

17. The apparatus of claim 15, further including a processor to determine an air mass flow rate based on the at least one of the pressure characteristic, the temperature characteristic or the velocity characteristic measured at the engine inlet.

18. The apparatus of claim 15, wherein the laser sensors are flush mounted to an inner surface of the frame defining the passageway such that the laser sensors do not interfere with an airflow moving through the passageway.

19. The apparatus of claim 15, wherein an inner surface of the frame defines an aerodynamic surface.

* * * * *